No. 847,874. PATENTED MAR. 19, 1907.
F. W. ANDREE.
FISH REEL.
APPLICATION FILED SEPT. 22, 1906.

WITNESSES:
O. R. Erwin
M. M. Schulz

INVENTOR
Frank W. Andree
BY
Erwin & Wheeler
ATTORNEYS.

THE NORRIS PETERS CO., WASHINGTON, D. C.

UNITED STATES PATENT OFFICE.

FRANK W. ANDREE, OF MILWAUKEE, WISCONSIN.

FISH-REEL.

No. 847,874.

Specification of Letters Patent.

Patented March 19, 1907.

Application filed September 22, 1906. Serial No. 335,765.

*To all whom it may concern:*

Be it known that I, FRANK W. ANDREE, a citizen of the United States, residing at Milwaukee, county of Milwaukee, and State of Wisconsin, have invented new and useful Improvements in Fish-Reels, of which the following is a specification.

My invention relates to improvements in fish-reels, and it pertains more especially to the mechanism for yieldingly controlling the revolving movement of the line-retaining spool both automatically and manually, whereby when a sudden jerk is given upon a slack line as the same is being wound upon a spool the spool will be free to revolve in the opposite direction from that which it is being turned by the handle without releasing the handle from the hand of the user or without reversing its movement, whereby the liability of the line becoming broken by a sudden pull upon it as a fish is being drawn in is avoided; also whereby the user may by a lateral pressure upon the handle increase the tension of the line, thereby retarding the speed of the fish until it is brought under control; also, whereby by an increased lateral pressure upon the handle the connecting mechanism between the crank and spool will become more firmly interlocked, so that the spool will revolve with the crank regardless of the pull upon the line, whereby the fish may be drawn in and raised from the water without the line unwinding from the spool.

My invention is further explained by reference to the accompanying drawings, in which—

Figure 1:
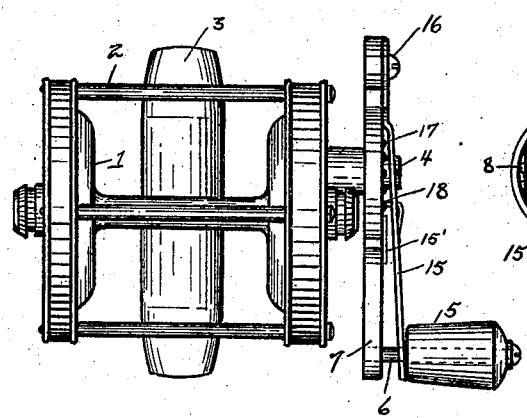
Figure 2:
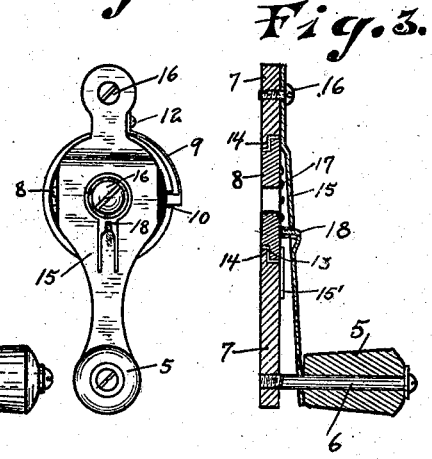
Figure 3:
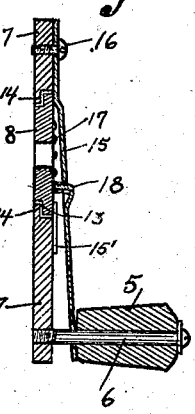
Figure 4:
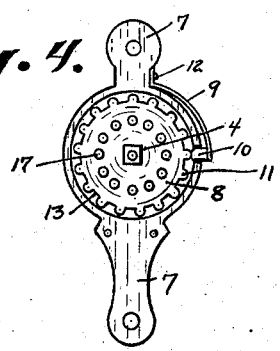

Figure 1 is a side view thereof. Fig. 2 is a front view of the crank and handle removed from the reel. Fig. 3 is a longitudinal section of the crank and handle, and Fig. 4 is a detail representing a front view of the crank and a part of the spool-connecting mechanism with the handle and handle-supporting arm removed.

Like parts are identified by the same reference characters throughout the several views.

The reel proper comprises the spool 1, spool-retaining frame 2, frame-supporting plate 3, crank-shaft 4, and the ordinary gears and pinions (not shown) by which motion is communicated from the crank-shaft 4 to the spool 1, all of which parts are of the ordinary construction.

My invention pertains more especially, as suggested, to the mechanism for communicating a revolving movement from the handle 5 to the shaft 4, an accelerating movement being communicated from the shaft 4 to the spool through a gear and pinion (not shown) in the ordinary manner. Motion is communicated from the handle 5 to the shaft 4 through the crank-pin 6, crank-arm 7, disk 8, and pawl 9. The disk is 8 rigidly connected with the shaft 4 and revolves with it. The crank-arm 7 is revolubly supported upon the disk and is adapted to revolve both with and independently of said disk. When the resistance to the spool is light, the contact-bearing 10 of the pawl 9 will engage the projections and depressions 11 of the disk with sufficient force to cause said disk to revolve with the crank. When, however, the resistance to the disk caused by a pull upon the line is greater than that of the contact-bearing 10 and projections and depressions 11, said disk and spool may revolve both with or independently of each other. Thus it is obvious that a slack line may be wound upon a spool by turning the crank in the ordinary manner, as the resistance of the pawl 9 will hold the bearing 10 against the bearings of the disk 8 with sufficient force to revolve the spool and wind up the line. When, however, the line is given a sharp sudden pull, which might otherwise break it, the spring-actuated stop 10 will slide from the projections and depressions 11 of the disk and permit the line to unwind without reversing or releasing the handle. The pawl 9 is rigidly affixed at one end to the crank-arm 7 by a screw 12, while its opposite end bears on the periphery of the disk 8. The rear surface of the disk 8 is provided with an annular channel 13, formed for the reception of the inwardly-extending annular flange 14, said flange 14 being formed integrally with said crank-arm, whereby the contiguous surface of said disk and crank-arm are caused to overlap each other in such a manner that the crank-arm is practically carried by and revolves upon the periphery of said disk. Said disk and crank-arm are thus retained in contact by the resilient plate 15 and stationary plate 15', which resilient plate is secured at one end to the face of the crank-arm 7 by a screw 16, while the opposite end of said plate is slidably connected with a crank-pin 6 between the crank-arm 7 and the handle 5, and the rear surface of said plate 15 bears against said disk 8, whereby the disk 8 is revolubly retained in place between said plate and the retaining-flange 14 of the crank-arm. The disk 8 and the crank-arm, together with the other parts connected therewith, are secured in place upon said crank-shaft 4 by a nut or screw 16, which has threaded bearings in the front end of said crank-supporting shaft. To manually control the revolving movement of the spool, I provide the surface of the disk 8 with an annular series of projections and depressions 17, and I also provide a pawl 18, which is adapted to bear yieldingly against said series with greater or less force at the will of the user. Thus it will be understood that when desirous to produce additional resistance to the unwinding of the line such resistance can be readily applied by a lateral pressure of the handle 5 against the free end of the plate 15 whereby the pawl 18 will be caused to bear with greater resistance against the series of projections and depressions 17, and the movement of the spool will be thereby retarded. So, also, when desirous to wind up the line against a heavy resistance as may be caused by raising a fish from the water the handle 5 may be pressed with sufficient force against the plate 15 to cause the spool to revolve with the crank regardless of the pull upon the line.

It will be understood that by the construction shown the crank-arm is at no time rigidly locked in connection with the spool, so that it requires the manual act of the user to disengage the same; but such parts are adapted to be automatically disengaged by simply releasing or diminishing the lateral pressure upon the handle, while by slight lateral pressure upon the handle the pawl connected with the crank-arm is caused to enter the depressions between the projections of the annular series, and thereby communicate the required movement to the disk for revolving the spool, while with a diminishing pressure it will produce the required resistance to the movement of the spool as the same is being unwound.

Having thus described my invention, what I claim as new, and desire to secure by Letters Patent, is—

1. The combination with the crank-shaft of a reel, of a disk rigidly affixed to said shaft, a crank-arm revolubly connected with said disk, and automatic means for yieldingly connecting said crank-arm and said disk together, comprising an annular series of projections and depressions formed on said disk and a yielding contact-bearing carried by said crank-arm whereby said disk and the spool connected therewith may be caused to revolve both with and independently of said crank-arm.

2. The combination with a crank-shaft of a fish-reel, of a disk rigidly affixed to said shaft, a crank-arm revolubly connected with said disk, automatic means for yieldingly connecting said crank-arm and said disk together, additional means actuated by a lateral pressure upon the operating-handle produced by the manual act of the user for increasing the resistance between the crank-arm and said rigidly-affixed disk and means for automatically releasing said disk from engagement with said crank-arm, whereby said disk and the spool connected therewith may be caused to revolve both with and independently of said crank and may be controlled both automatically and at the will of the user.

3. The combination with the crank-shaft of a fish-reel, of a disk rigidly affixed to said shaft, an annular series of projections and depressions formed on the periphery of said disk, a crank-arm revolubly connected with said disk, a spring-pawl provided with a convex contact-bearing said spring-pawl being rigidly affixed at one end to said crank-arm and adapted to slidably bear at its opposite end against said series of projections, means for securing said crank-arm revolubly to said disk, means for rigidly securing said disk to said crank-shaft and means for revolving said shaft by the manual act of the user.

4. The combination with the crank-shaft of a fish-reel, of a disk rigidly affixed to said shaft, an annular series of projections and depressions formed on the periphery of said disk, a second annular series of projections and depressions formed upon the face of said disk, a crank-arm revolubly connected with said disk, a spring-actuated pawl affixed at one end to said crank-arm, having slidable contact-bearings against the projections and depressions on the periphery of said disk, a resilient plate connected at one end to said crank-arm, a pawl affixed at one end to said resilient plate and adapted to slidably bear against the projections and depressions formed upon the face of said disk, means for revolubly connecting the operating-handle to said crank-arm in contact with said resilient plate, whereby by the lateral movement of said handle, said last-named pawl will be caused to impinge against the projections and depressions formed on the face of said disk, and whereby the action of said disk and spool connected therewith may be controlled by the manual act of the user.

In testimony whereof I affix my signature in the presence of two witnesses.

FRANK W. ANDREE.

Witnesses:
JAS. B. ERWIN,
O. R. ERWIN.